United States Patent [19]

Nishikawa et al.

[11] Patent Number: 5,391,699
[45] Date of Patent: Feb. 21, 1995

[54] POLYESTER COPOLYMER AND A PROCESS FOR THE PRODUCTION OF THE SAME

[75] Inventors: Tomohisa Nishikawa, Tokyo; Takeshi Kinoshita, Saitama; Toshihiko Yotsumoto, Tokyo, all of Japan

[73] Assignee: Bridgestone Corporation, Tokyo, Japan

[21] Appl. No.: 55,386

[22] Filed: May 3, 1993

[30] Foreign Application Priority Data

May 1, 1992 [JP] Japan .................................. 4-112681

[51] Int. Cl.⁶ .............................................. C08G 69/08
[52] U.S. Cl. ........................... 528/292; 528/272; 528/288; 528/298; 528/302; 528/307; 528/308; 528/308.6; 528/335
[58] Field of Search ............... 528/272, 288, 298, 302, 528/307, 308, 308.6, 335, 292

[56] References Cited

U.S. PATENT DOCUMENTS

| 4,182,842 | 1/1980 | Winston et al. | 528/292 |
| 4,732,959 | 3/1988 | Otani et al. | 528/68 |
| 4,839,128 | 6/1989 | Yoshino et al. | 264/328.1 |
| 5,134,223 | 7/1992 | Langer et al. | 528/272 |

FOREIGN PATENT DOCUMENTS 55-137217 10/1980 Japan .

OTHER PUBLICATIONS

Vestsi Akad. Navuk BSSR, Ser. Khim. Navuk. vol. 1, pp. 105–108.
Research Disclosure, No. 128, pp. 25–26.
J. Appl. Polym. Sci., vol. 8, No. 25, pp. 1685–1694.

*Primary Examiner*—Samuel A. Acquah
*Attorney, Agent, or Firm*—Sughrue, Mion, Zinn, Macpeak & Seas

[57] ABSTRACT

A polyester copolymer having an aromatic amine incorporated in the main chain, which is excelent in thermal stability as well as dynamic property, and a process for the production of the polyester copolymer, whereby the existing installation of the prior art can be used as it is, thus resulting in lowering of the production cost, are provided. The polyester copolymer comprises an aromatic dicarboxylic acid, diol and at least one compound selected from the group consisting of aromatic compounds having amino group, represented by the following general formula (I), $$H_2N-X-COOR \qquad (I)$$

wherein X is an aromatic ring-containing group and R is a hydrogen atom or a hydrocarbon group selected from the group consisting of alkyl groups and cycloalkyl groups.

12 Claims, 1 Drawing Sheet

POLYESTER COPOLYMER AND A PROCESS FOR THE PRODUCTION OF THE SAME

BACKGROUND OF THE INVENTION

1. Field of the Invention

This invention relates to a novel polyester copolymer and a process for the production of the same.

2. Description of the Prior Art

Polyesters, in particular, polyethylene terephthalate (hereinafter referred to as PET) has a high initial modulus of elasticity as well as excellent thermal dimension stability of widely available polymers and application thereof to tire codes has rapidly been increasing as an industrial material having severer requirements. However, a higher initial modulus of elasticity, more excellent thermal dimension stability and lower heat shrinkage are strongly required than at the present time because of providing a product with high quality, high function and high additional value and accordingly, even when using PET having excellent properties as described above, a large improvement is still required.

A number of proposals have hitherto been made concerning improvement of various properties. Of these proposals, methods of improving polyesters can be classified into the following groups:

1) Improvement on the molecular level as is found in utilization of a copolymerization reaction.
2) Improvement in the molecular weight and in the core-sheath structure with a polymerized product.
3) Change of conditions such as melt spinning, solution spinning, stretching, heat treatment, etc. and improvement of each of the apparatus used therefor.
4) Improvement of after-working for each of the products.

Above all, the improving method 1) comprising adding an aimed improvement material in the polymerization step of the polyester will be useful for the practice on a commercial scale.

The polyester is ordinarily produced by direct esterification of an aromatic dicarboxylic acid and a diol compound by stirring and heating the mixture under some or normal pressure, or by subjecting an alkyl ester of dicarboxylic acid and a diol compound to transesterification to obtain an ester compound and low polymer and then subjecting it to polycondensation by stirring and heating the mixture in a high vacuum.

In addition to these ordinary methods, a number of proposals have hitherto been made as to improvement in the molecular level as appeared in the utilization of the above described copolymerization reaction, for example, a method comprising acetylation of the amino group of p-amino benzoic acid and then effecting the polymerization [Journal of Applied Polymer Science, Vol. 25, 1685-1694 (1980)], a method comprising adding, at the initial period of melt polycondensation of a polyester, an aromatic diamine and aromatic dicarboxylic acid or substituted derivatives and effecting the polycondensation (Japanese Patent Laid-Open Publication No. 67009/1980), and a method comprising adding, at the initial period of melt polycondensation of a polyester, an aminocarboxylic acid compound having an aromatic ring and effecting the polycondensation (Japanese Patent Laid-Open Publication No. 137217/1980). In any method, a substituted derivative of a compound having amino group is utilized from the initial period of the reaction or a compound having amino group is added at the initial period of melt polycondensation of a polyester.

In the utilization of a copolymerization reaction for the improvement on molecular level, a segment for the improvement can be incorporated in a host molecular chain and it is thus possible to choose the variety of an additive and the copolymerization proportion according to the object of the improvement, for example, the thermal dimension stability, heat shrinkage, initial modulus of elasticity, elongation, toughness, etc. of a molded article of the copolymer.

The means for incorporating an aromatic compound having an amino group into a polyester molecular chain according to the present invention is based on this consideration relating to designing on a molecular level.

Since the aimed-improvement can be accomplished by designing on a molecular level according to this means, as described above, a number of proposals have hitherto been made, but there arise problems in these proposals that in the case of a copolymerization reaction of an aromatic compound having an amino group with a polyester-forming compound, having been proposed up to the present time, a substituted derivative is once formed, for example, by acetylation before the copolymerization reaction and then subjected to the copolymerization reaction, thus resulting in increase of the costs for raw materials and for installation of reaction vessels before the existing polyester reaction process. In addition, in the case of adding an aromatic compound having amino group at the initial period of melt polycondensation, there arises a problem that the existing polyester reaction process must be improved, for example, by installing a conduit for introducing an aromatic compound having an amino group at the late period of the esterification reaction or transesterification reaction or by installing a conduit provided with a means for preventing vacuum leakage, in particular, in the case of adding an aromatic compound having an amino group at the initial period of a polycondensation when the reaction proceeds in vacuum. Anyway, it is essential to install a new introduction conduit in the existing process.

SUMMARY OF THE INVENTION

It is an object of the present invention to provide a new polyester copolymer and a process for the production of the same, whereby the above described problems can be solved.

It is another object of the present invention to provide a polyester copolymer having an aromatic amine incorporated in the main chain, which is excellent in thermal stability as well as dynamic property.

It is a further object of the present invention to provide a process for the production of a polyester copolymer, whereby the existing installation of the prior art can be used as it is.

These objects can be attained by a polyester copolymer comprising an aromatic dicarboxylic acid, diol and at least one compound selected from the group consisting of aromatic compounds having an amino group, represented by the following general formula (I),

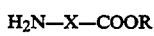 (I)

wherein X is an aromatic ring-containing group such as benzene, naphthalene, pyrene, biphenyl, anthracene, phenanthrene and the like and R is a hydrogen atom or a hydrocarbon group such as alkyl group or cycloalkyl group.

BRIEF DESCRIPTION OF THE DRAWING

The accompanying drawing is to illustrate the principle and merits of the present invention.

DETAILED DESCRIPTION OF THE INVENTION

Figure 1:
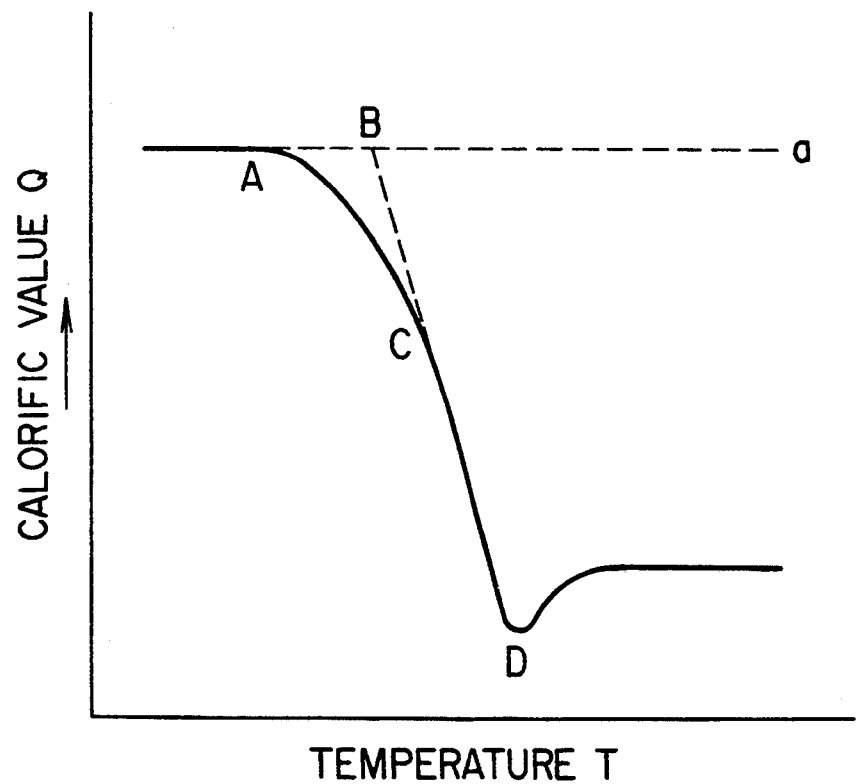
FIG. 1 is a graph to illustrate a method of measuring the glass transition temperature and melting point of the copolymers in the Examples and Comparative Examples by means of a differential scanning calorimeter.

The inventors have made various efforts to attain the above described objects and consequently, have reached the present invention. Accordingly, the present invention provides a polyester type copolymer comprising an aromatic dicarboxylic acid, diol and at least one compound selected from the group consisting of aromatic compounds having an amino group, represented by the general formula (I).

Specifically, the polyester copolymer of the present invention comprises an aromatic dicarboxylic acid, diol and at least one compound selected from the group consisting of aromatic compounds having an amino group, represented by the following general formula (II),

$$H_2N-X-COOH \quad\quad (II)$$

wherein X has the same meaning as described above, or an aromatic dicarboxylic acid, diol and at least one compound selected from the group consisting of aromatic compounds having amino group, represented by the following general formula (III),

$$H_2N-X-COOR' \quad\quad (III)$$

wherein X has the same meaning as described above and R' is a hydrocarbon group such as alkyl group or cycloalkyl group.

Alternatively, the polyester copolymer of the present invention comprises an aromatic dicarboxylic acid, diol and at least one compound selected from the group consisting of aromatic compounds having amino group, represented by the general formula (II) and at least one compound selected from the group consisting of aromatic compounds having amino group, represented by the general formula (III).

Preparation of the polyester copolymer of the present invention is carried out by mixing an aromatic dicarboxylic acid, diol and at least one compound selected from the group consisting of aromatic compounds having amino group, represented by the general formula (I) before the esterification reaction, subjecting the mixture to the esterification reaction and then effecting the melt polycondensation.

In the present invention, the above described diol is preferably an aliphatic diol and it is more preferable to use ethylene glycol as the diol and terephthalic acid as the aromatic dicarboxylic acid.

The polyester copolymer of the present invention has preferably a molecular weight of several hundreds to several millions (several×$10^6$), preferably $2 \times 10^4$ to $50 \times 10^4$, a melting point of at least 200° C. and a glass transition temperature of at least 75 ° C.

According to the present invention, copolymerization reaction of an aromatic compound having amino group with a polyester-forming compound can be rendered possible by utilizing the existing polyester reaction process as it is without reacting an aromatic compound having amino group to form a subtituted compound such as an acetyl compound, without additionally installing a new reaction vessel in the existing polyester process and without improving the existing polyester reaction.

Specifically, it is found that when an aromatic compound having amino group, as an additive, is copolymerized with polyethylene terephthalate (PET) molecular chain, the aromatic compound having amino group is only added in the step of mixing ethylene glycol and terephthalic acid to form a paste, whereby the subsequent copolymerization reaction can be used as it is without improving the existing PET reaction process.

In the present invention, the order of mixing a diol, dicarboxylic acid and aromatic compound having amino group is not particularly limited, but the diol, dicarboxylic acid and aromatic compound having amino group can simultaneously be mixed, arbitrary two components can first be mixed and then mixed with the remaining component or the three components can one by one be mixed in arbitrary order.

The reaction leading to the copolymer after mixing the raw materials can be carried out in conventional manner in the polyester polycondensation, i.e. by an esterification step carried out in thermal stirring at some or normal pressure and a polycondensation step carried out in thermal stirring at reduced pressure, during which suitable amounts of a catalyst, stabilizer, oxidation inhibitor, heat resisting agent, antioxidant, etc. can preferably be added.

The present invention will now be illustrated in detail. PET used in this specification is a copolyester, homopolyester or polyester mixture thereof comprising, as a predominant component unit, ethylene terephthalate units, that is, a copolyester, homopolyester or polyester mixture thereof comprising generally at least 85 mol % of ethylene terephthalate units, preferably at least 90 mol % of ethylene terephthalate units. In PET of the present invention, the following compounds containing carboxyl group and hydroxyl group as functional groups can be incorporated as copolymeric components in addition to the ethylene glycol and terephthalic acid.

Examples of the copolymeric component having carboxyl group include isophthalic acid, 2,6-naphthalenendicarboxylic acid, adipic acid, sebacic acid, oxalic acid and the like. Examples of the copolymeric component having hydroxyl group include diethylene glycol, propylene glycol, 1,4-cyclohexanediol and the like. As a component having both the carboxyl group and hydroxyl group, there is used p-oxybenzoic acid. Furthermore, derivatives thereof can be used and the copolymeric components are not limited to the above described examples.

Examples of the aromatic compound (I) having amino group include p-aminobenzoic acid, m-aminobenzoic acid, 2-amino-6-carboxynaphthalene, 1-amino-5-carboxynaphthalene, 4-amino-4'-carboxydiphenyl, 4-amino-4'-carboxydiphenylmethane, 2-amino-6-carboxyanthracene, 4-amino-3-methylbenzoic acid, 3-amino-2-methylbenzoic acid, 3-amino-4-methylbenzoic acid, 4-amino-2-chlorobenzoic acid, 3-amino-4-chlorobenzoic acid, 4-amino-3-methoxybenzoic acid, 3-amino-4-methoxybenzoic acid, 1-amino-6-carboxypyrene, 2-amino-7-carboxypyrene, 2-amino-7-carboxyphenanthrene, and methyl p-aminobenzoate, ethyl p-aminobenzoate, butyl p-aminobenzoate, cyclohexyl p-aminobenzoate, methyl m-aminobenzoate, ethyl m-aminobenzoate, butyl m-aminobenzoate, cyclohexyl m-aminobenzoate and the like.

The quantity of the aromatic compound (I) having amino group in the case of adding only one of the aromatic compounds (I) is 1.0 to 30 mol %, preferably 1.0 to 25 mol %, more preferably 1.0 to 20 mol % to the terephthalic acid.

When two or more of the aromatic compounds (I) each having amino group are copolymerized, the sum of the quantities thereof is 1.0 to 30 mol %, preferbly 1.0 to 25 mol %, 1.0 to 20 mol % based on the terephthalic acid.

In the present invention, the quantity of the diol before the reaction is generally larger than that of the dicarboxylic acid, but because of the copolymerization reaction under reduced pressure, the excessive diol component leaves the system to be approximately similar to the dicarboxylic acid in the copolymer.

When using the polyester copolymer of the present invention as a rubber reinforcing agent, the melting point and glass transition temperature of the copolymer are very important properties since the thermal stability chracteristic of the material is required. The melting point of the copolymer when adding the aromatic compound having amino group is preferably at least 200° C., more preferably at least 210° C., and the glass transition temperature is preferably at least 75° C.

During the copolymerization reaction, addition or non-addition of stabilizers, oxidation inhibitors, heat resisting agents, antioxidants, etc., varieties thereof and amounts thereof are not particularly limited and when the addition thereof is carried out if necessary, preferred results can be obtained.

The copolymer of the present invention having a high initial modulus of elasticity, excellent thermal dimension stability and low heat shrinkage is particularly useful as industrial materials such as reinforcing materials of tires, V-belts, conveyor belts, etc., and as various films, sail cloths, nets, fishing nets or resins for various composite materials.

EXAMPLE

The following examples are given in order to illustrate the present invention in detail without limiting the same. The glass transition temperatures, melting points and molecular weights of copolymers and identifications of copolymers in the following examples were carried out as follows:

Glass Transition Temperature and Melting Pont of Copolymer

The glass transition temperature and melting point were measured by using a differential scanning calorimeter (Type 990 -commercial name- made by Du Pont Co.), heating 5 mg of a sample to 290° C. in a nitrogen atmosphere at a temperature-raising rate of 40° C./min, maintaining at the same temperature for 5 minutes, then rapidly cooling in ice water and temperature-raising at a rate of 10° C.

The glass transition temperature is defined by a temperature at an intersecting point B of a ground line a and a tangent line at an inflection point C of a curve ACD, as shown in FIG. 1.

The melting point is defined by a peak temperature of a melting peak.

Molecular Weight of Copolymer

A copolymer after finishing of the polycondensation was rapidly cooled in ice water to prepare a sample. 5.0 mg of this sample was dissolved in 100 $\mu$l of 1,1,1,3,3,3-hexafluoro-2-propanol, to which 12.5 ml of chloroform was added, and the mixture was subjected to measurement of the molecular weight by means of a high speed GCP (HLC 8020 -commercial name- made by Toso KK). The weight average molecular weight thus obtained (in terms of polystyrene) is shown as Mw in Table 1.

Identification as Copolymer

The reaction was carried out by adding an aromatic compound having amino group to obtain a polycondensed product, which was reprecipitated to wash out unreacted products, and the resulting precipitate was then subjected to elementary analysis (C, H, N) to obtain such a result that the proportion of C, H and N corresponds to the added amounts. An absorption due to aide linkage was observed by infrared absorption. From the result of $^{13}$C—NMR of the washed product were obtained chemical shifts respectively corresponding to formation of amide linkage from the amino group of the aromatic compound having amino group and of ester linkage from the carboxyl group of the aromatic compound having amino group. It was thus confirmed that the aromatic compound having amino group was present in the main chain of the polycondensed product.

Typical examples of the measured values in the copolymer of p-aminobenzoic acid (p-ABA) by $^{13}$C—NMR are shown in the following:

| | | Found Value |
|---|---|---|
| 1) 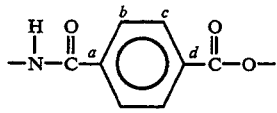 | | a. 138.5<br>b. 127.5<br>c. 130.7<br>d. 132.3 |
| 2) 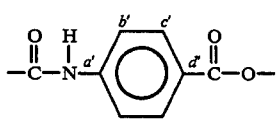 | | a'. 141.7<br>b'. 120.9<br>c'. 131.4<br>d'. 126.3 |
| 3) 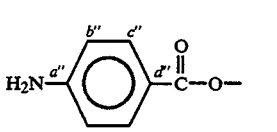 | | a''. 152.6<br>b''. 112.3<br>c''. 130.7<br>d''. 120.9 |

In the measurement 1), it is shown that at least one carboxyl group of the terephthalic acid (TA) forms amide linkage. In the measurement 2), it is shown that the amino group of the p-aminobenzoic acid forms amide linkage with the terephthalic acid. In the measurement 3), it is shown that the amino group of the p-aminobenzoie acid is present at the terminal of the molecular chain.

It is apparent from the above described results that in the present invention, the added p-aminobenzoic acid is present in at least two states such that the amino group forms amide linkage in the molecular chain and is positioned at the terminal of the molecular main chain.

EXAMPLE 1

2 mols of terephthalic acid, 3 mols of ethylene glycol, antimony trioxide as a catalyst ($2 \times 10^{-4}$ mol based on terephthalic acid) and 1 mol % of p-aminobenzoic acid based on the terephthalic acid were charged in a reaction vessel equipped with a stirrer, which was then adequately replaced by nitrogen gas and compressed to 1.8 kg/cm$^2$ by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled in ice water. The characteristic values of the polycondensed copolymer are shown in Table 1 and the values of elementary analysis are shown in Table 2.

For comparison, the polycondensation reaction was carried out as to a system free from addition of the aromatic compound having amino group in an analogous manner to Example 1 to obtain a copolymer having characteristic values shown in Table 1 with elementary analysis values shown in Table 2 (Comparative Example 1).

EXAMPLE 2

2 mols of terephthalic acid, 3 mols of ethylene glycol, antimony trioxide as a catalyst ($2 \times 10^{-4}$ mol based on terephthalic acid) and 10 mol % of p-aminobenzoic acid based on the terephthalic acid were charged in a reaction vessel equipped with a stirrer, which was then adequately replaced by nitrogen gas and compressed to 1.8 kg/cm$^2$ by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled in ice water. The characteristic values of the polycondensed copolymer are shown in Table 1 and the values of elementary analysis are shown in Table 2.

EXAMPLES 3 to 5

The procedure of Example 1 was repeated except varying the amount of p-aminobenzoic acid charged. The characteristic values of the polycondensed copolymers are shown in Table 1.

EXAMPLE 6

2 mols of terephthalic acid, 3 mols of ethylene glycol, antimony trioxide as a catalyst ($2 \times 10^{-4}$ mol based on terephthalic acid) and 10 mol % of m-aminobenzoic acid based on the terephthalic acid were charged in a reaction vessel equipped with a stirrer, which was then adequately replaced by nitrogen gas and compressed to 1.8 kg/cm$^2$ by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled in ice water. The characteristic values of the polycondensed copolymer are shown in Table 1 and the values of elementary analysis are shown in Table 2.

EXAMPLE 7

2 mols of terephthalic acid, 3 mols of ethylene glycol, antimony trioxide as a catalyst ($2 \times 10^{-4}$ mol based on terephthalic acid) and 10 mol % of m-amino-6-carboxynaphthalene based on the terephthalic acid were charged in a reaction vessel equipped with a stirrer, which was then adequately replaced by nitrogen gas and compressed to 1.8 kg/cm$^2$ by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled ice water. The characteristic values of the polycondensed copolymer are shown in Table 1 and the values of elementary analysis are shown in Table 2.

EXAMPLE 8

2 mols of terephthalic acid, 3 mols of ethylene glycol, antimony trioxide as a catalyst ($2 \times 10^{-4}$ mol based on terephthalic acid) and 10 mol % of 4-amino-4'-carboxybiphenyl based on the terephthalic acid were charged in a reaction vessel equipped with a stirrer, which was then adequately replaced by nitrogen gas and compressed to 1.8 kg/cm$^2$ by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled ice water. The characteristic values of the polycondensed copolymer are shown in Table 1 and the values of elementary analysis are shown in Table 2.

EXAMPLE 9

2 mols of terephthalic acid, 3 mols of ethylene glycol, antimony trioxide as a catalyst ($2 \times 10^{-4}$ mol based on terephthalic acid) and 0.5 mol % of p-aminobenzoic acid based on the terephthalic acid were charged in a reaction vessel equipped with a stirrer, which was then adequately replaced by nitrogen gas and compressed to 1.8 kg/cm$^2$ by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled in ice water. The characteristic values of the polycondensed copolymer are shown in Table 1 and the values of elementary analysis are shown in Table 2.

EXAMPLE 10

2 mols of terephthalic acid, 3 mols of ethylene glycol, antimony trioxide as a catalyst ($2 \times 10^{-4}$ mol based on terephthalic acid) and 35 mol % of p-aminobenzoic acid based on the terephthalic acid were charged in a reaction vessel equipped with a stirrer, which was then adequately replaced by nitrogen gas and compressed to 1.8 kg/cm² by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled in ice water. The characteristic values of the polycondensed copolymer are shown in Table 1 and the values of elementary analysis are shown in Table 2.

EXAMPLE 11

2 mols of terephthalic acid, 3 mols of ethylene glycol, antimony trioxide as a catalyst ($2 \times 10^{-4}$ mol based on terephthalic acid) and 0.1 mol % of methyl p-aminobenzoate based on i mol % of the terephthalic acid were charged in a reaction vessel equipped with a stirrer, which was then adequately replaced by nitrogen gas and compressed to 1.8 kg/cm² by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled in ice water. The characteristic values of the polycondensed copolymer are shown in Table 1 and the values of elementary analysis are shown in Table 2.

EXAMPLE 12

2 mols of terephthalic acid, 3 mols of ethylene glycol, antimony trioxide as a catalyst ($2 \times 10^{-4}$ mol based on terephthalic acid) and 0.1 mol % of ethyl p-aminobenzoate based on 1 mol % of the terephthalic acid were charged in a reaction vessel equipped with a stirrer, which was then adequately replaced by nitrogen gas and compressed to 1.8 kg/cm² by nitrogen gas, and the mixture was reacted at 240° C. After removing water in substantially stoichiometric amount out of the system, the polycondensation reaction was carried out at 40 mmHg and 255° C. for 60 minutes, at 15 mmHg and 270° C. for 60 minutes and at lower than 1 mmHg and 275° C. until a predetermined degree of polymerization was obtained and after the reaction, the reaction mixture was immediately cooled in ice water. The characteristic values of the polycondensed copolymer are shown in Table 1 and the values of elementary analysis are shown in Table 2.

TABLE 1

| Example | Additive Component Compound Name | Mol % | Polyester Copolymer Mw ($\times 10^4$) | Tm (°C.) | Tg (°C.) |
|---|---|---|---|---|---|
| Comparative Example 1 | — | — | 6.8 | 254.3 | 68.4 |
| Example 1 | p-ABA | 1.0 | 6.9 | 252.4 | 75.6 |
| Example 2 | p-ABA | 10.0 | 6.7 | 236.1 | 79.8 |
| Example 3 | p-ABA | 15.0 | 7.3 | 227.8 | 80.7 |
| Example 4 | p-ABA | 20.0 | 7.5 | 220.0 | 82.9 |
| Example 5 | p-ABA | 25.0 | 7.4 | 212.5 | 85.0 |
| Example 6 | m-ABA | 10.0 | 8.1 | 232.4 | 76.4 |
| Example 7 | 2,6-ANA | 10.0 | 6.6 | 228.0 | 80.7 |
| Example 8 | 4,4'-ACB | 10.0 | 6.4 | 231.5 | 79.9 |
| Example 9 | p-ABA | 0.5 | 7.2 | 253.8 | 72.3 |
| Example 10 | p-ABA | 35.0 | 6.3 | n.d. | 90.8 |
| Example 11 | p-ABM | 10.0 | 7.1 | 228.0 | 80.7 |
| Example 12 | p-ABE | 10.0 | 7.5 | 225.4 | 81.1 |

Note:
p-ABA: p-aminobenzoic acid
m-ABA: m-aminobenzoic acid
2,6-ANA: 2-amino-6-carboxynaphthalene
4,4'-ACB: 4-amino-4'-carboxybiphenyl
p-ABM: methyl p-aminobenzoate
p-ABE: ethyl p-aminobenzoate

TABLE 2

| | Additive Component | | Elementary Analysis | | | | | |
|---|---|---|---|---|---|---|---|---|
| | Compound | Mol | Found | | | Calculated | | |
| Example | Name | % | C | H | N | C | H | N |
| Comparative Example 1 | (PET) | — | 93.59 | 6.41 | — | 93.71 | 6.29 | — |
| Example 1 | p-ABA | 1.0 | 93.73 | 6.18 | 0.09 | 93.52 | 6.37 | 0.11 |
| Example 2 | p-ABA | 10.0 | 92.42 | 6.60 | 0.98 | 92.42 | 6.49 | 1.09 |
| Example 3 | p-ABA | 15.0 | 91.71 | 6.85 | 1.44 | 91.81 | 6.56 | 1.63 |
| Example 4 | p-ABA | 20.0 | 90.99 | 7.10 | 1.91 | 91.22 | 6.62 | 2.16 |
| Example 5 | p-ABA | 25.0 | 90.25 | 7.36 | 2.39 | 90.61 | 6.69 | 2.70 |
| Example 6 | m-ABA | 10.0 | 92.44 | 6.76 | 0.80 | 92.42 | 6.49 | 1.09 |
| Example 9 | p-ABA | 0.5 | 93.80 | 6.15 | 0.05 | 93.57 | 6.37 | 0.06 |
| Example 10 | p-ABA | 35.0 | 88.76 | 7.86 | 3.38 | 89.36 | 6.82 | 3.82 |
| Example 11 | p-ABM | 10.0 | 92.46 | 6.52 | 1.02 | 92.42 | 6.49 | 1.09 |
| Example 12 | p-ABE | 10.0 | 92.45 | 6.51 | 1.04 | 92.42 | 6.49 | 1.09 |

As shown in Table 1, in Examples 1 to 12 of the present invention, there were obtained polyester copolymers each having a higher glass transition temperature than PET only by polycondensation of the raw materials for PET with an aromatic compound having amino group. This is largely due to the presence of the aromatic compound having amino group in the molecular main chain or at the terminal of the molecular chain, as shown in the foregoing NMR analysis and elementary analysis. That is, it is considered that a higher glass transition temperature than PET is observed because the movement of the molecular chain is restricted by the aromatic ring and the hydrogen bond formed by the amino group and amide linkage, which are more rigid than the ethylene glycol segment.

As described above, the copolymer of the present invention having a higher glass transition temperature than PET exhibits a higher initial modulus of elasticity, more excellent thermal dimension stability and lower heat shrinkage.

In Example 9, however, some increase of the glass transition temperature is found, but the significance of the present invention is small because of addition of the smaller amount of the p-aminobenzoic acid.

In Example 10, no melting point was found in DSC surve. Accordingly, it will be understood from the standpoint of the thermal stability and dynamic properties in the case of applying to industrial materials that the additive amount of the aromatic compound should preferably be in the range of 1.0 to 30 mol %.

As apparent from the foregoing illustration and examples, according to the present invention, there is the provision of a polyester copolymer having an aromatic amine incorporated in the main chain, which is excelent in thermal stability as well as dynamic property, and a process for the production of a polyester copolymer, whereby the existing installation of the prior art can be used as it is, thus resulting in lowering of the production cost

What is claimed is:

1. A polyester copolymer comprising an aromatic dicarboxylic acid, diol and at least one compound selected from the group consisting of aromatic compounds having an amino group, represented by the following general formula (I), $$H_2N-X-COOR \qquad (I)$$

wherein X is an aromatic ring-containing group and R is a hydrogen atom or a hydrocarbon group selected from the group consisting of $C_1-C_4$ alkyl groups and cyclohexyl groups, wherein the polyester copolymer comprises at least 85 mol % of ethylene terephthalate.

2. The polyester copolymer as claimed in Claim 1, wherein the aromatic dicarboxylic acid is selected from the group consisting of terephthalic acid, isophthalic acid and 2,6-naphthalenedicarboxylic acid.

3. The polyester copolymer as claimed in Claim 1, wherein the diol is selected from the group consisting of aliphatic diols.

4. The polyester copolymer as claimed in Claim 3, wherein the aliphatic diols are ethylene glycol, diethylene glycols, propylene glycol or 1,4-cyclohexanediol.

5. The polyester copolymer as claimed in Claim 1, wherein the diol is ethylene glycol and the aromatic dicarboxyic acid is terephthalic acid.

6. The polyester copolymer as claimed in Claim 1, wherein the aromatic compound having an amino group is present in a proportion of 1 to 30 mol % to the the aromatic carboxylic acid.

7. The polyester copolymer as claimed in Claim 1, wherein the polyester copolymer has a melting point of at least 200° C.

8. The polyester copolymer as claimed in Claim 1, wherein the polyester copolymer has a glass transition temperature of at least 75° C.

9. The polyester copolymer as claimed in Claim 1, wherein at least one compound selected from the group consisting of aromatic compounds having amino group, represented by the following general formula (II), $$H_2N-X-COOH \qquad (II)$$

wherein X has the same meaning as described above, and at least one compound selected from the group consisting of aromatic compounds having amino group, represented by the following general formula (III), $$H_2N-X-COOR' \qquad (III)$$

wherein X has the same meaning as described above and R' is an $C_1-C_4$ alkyl group or cyclohexyl group are used in combination.

10. The polyester copolymer as claimed in Claim 1, wherein the aromatic compound having an amino group is selected from the group consisting of p-aminobenzoic acid, m-aminobenzoie acid, 2-amino-6-carboxynaphthalene, 1-amino-5-carboxynaphthalene, 4-amino-4'-carboxydiphenyl, 4-amino-4'-carboxydiphenylmethane, 2-amino-6-carboxyanthracene, 4-amino-8-methylbenzoic acid, 3-amino-2-methylbenzoic acid, 3-amino-4-methylbenzoic acid, 4-amino-2-chlorobenzoic acid, 3-amino-4-chlorobenzoic acid, 4-amino-3-methoxybenzoic acid, 3-amino-4-methoxybenzoic acid, 1-amino-6-carboxypyrene, 2-amino-7-carboxypyrene, 2-amino-7-carboxyphenanthrene, and methyl p-aminobenzoate, ethyl p-aminobenzoate, butyl p-aminobenzoate, cyclohexyl p-aminobenzoate, methyl m-aminobenzoate, ethyl m-aminobenzoate, butyl m-aminobenzoate and cyclohexyl m-aminobenzoate.

11. A process for the production of a polyester copolymer, which comprises mixing an aromatic dicarboxylic acid, diol and at least one aromatic compound having an amino group, represented by the general formula (I), $$H_2N-X-COOR \qquad (I)$$

wherein X is an aromatic ring-containing group and R is a hydrogen atom or a hydrocarbon group selected from the group consisting of $C_1-C_4$ alkyl groups and cyclohexyl groups, before esterification subjecting the mixture to the esterification and then effecting melt polycondensation of the product.

12. The polyester copolymer as claimed in Claim 1, wherein the polyester copolymer has a weight average molecular weight of $2 \times 10^4$ to $50 \times 10^4$.

* * * * *